US 8,097,810 B2

(12) United States Patent
Benestad et al.

(10) Patent No.: US 8,097,810 B2
(45) Date of Patent: Jan. 17, 2012

(54) HIGH PRESSURE, HIGH VOLTAGE PENETRATOR ASSEMBLY

(76) Inventors: Harald Benestad, Oslo (NO); Pål Georg Benestad, Drammen (NO)

(*) Notice: Subject to any disclaimer, the term of this patent is extended or adjusted under 35 U.S.C. 154(b) by 138 days.

(21) Appl. No.: 12/278,502

(22) PCT Filed: Jun. 25, 2008

(86) PCT No.: PCT/NO2008/000237
§ 371 (c)(1),
(2), (4) Date: Sep. 25, 2008

(87) PCT Pub. No.: WO2009/002187
PCT Pub. Date: Dec. 31, 2008

(65) Prior Publication Data
US 2010/0206630 A1     Aug. 19, 2010

(30) Foreign Application Priority Data

Jun. 25, 2007  (NO) .................................. 20073266
Jun. 25, 2008  (NO) .................................. 20082895

(51) Int. Cl.
*H01B 17/26*     (2006.01)
(52) U.S. Cl. ................. 174/152 R; 174/70 S; 174/88 C; 439/199; 385/138
(58) Field of Classification Search .............. 174/70 S, 174/88 C, 75 C, 152 R, 360; 439/199, 201; 385/138
See application file for complete search history.

(56) References Cited

U.S. PATENT DOCUMENTS

| | | | |
|---|---|---|---|
| 5,154,741 A | 10/1992 | da Costa Filho | |
| 6,067,395 A | 5/2000 | Cairns et al. | |
| 6,364,677 B1 | 4/2002 | Nysveen et al. | |
| 6,677,536 B2 * | 1/2004 | Alznauer et al. | 174/152 R |
| 6,924,438 B2 * | 8/2005 | Geibel | 174/152 R |
| 2001/0022886 A1 | 9/2001 | Cairns et al. | |
| 2004/0058575 A1 | 3/2004 | Nicholson | |
| 2005/0186823 A1 | 8/2005 | Ring et al. | |

FOREIGN PATENT DOCUMENTS

| | | |
|---|---|---|
| FR | 2623344 | 5/1989 |
| GB | 2196051 | 4/1988 |
| GB | 2003033867 | 4/2003 |
| NO | 2004055950 | 7/2004 |

* cited by examiner

*Primary Examiner* — Dhirubhai R Patel
(74) *Attorney, Agent, or Firm* — Rodman & Rodman (57) ABSTRACT

The invention relates to a high pressure, high voltage penetrator assembly for subsea, topside or land based use, wherein the assembly is upright attachable to a wet gas and/or liquid handling compressor or pump or to/from a transformer, and wherein the assembly includes a penetrator unit for feed-through of electric power to a motor of the compressor or pump or to/from the transformer; a funnel shaped housing with a housing chamber, the penetrator unit being located at an upper end of the chamber; a grid located inside the chamber transversely of a longitudinal axis of the chamber, the penetrator unit being located above the grid, a filter located in the chamber below the grid and above an inlet to a housing of the motor or to/from a housing of the transformer, and a sensor unit extending into the chamber from the penetrator unit and towards, but spaced from the grid.

40 Claims, 8 Drawing Sheets

//www.w3.org/1999/xhtml">
HIGH PRESSURE, HIGH VOLTAGE PENETRATOR ASSEMBLY

CROSS REFERENCE TO RELATED APPLICATIONS

This application is a Continuation-In-Part of U.S. patent application Ser. No. 11/928,430, filed Oct. 30, 2007, now U.S. Pat. No. 7,718,899 and U.S. patent application Ser. No. 12/624,139, now abandoned.

STATEMENT REGARDING FEDERALLY SPONSORED RESEARCH OR DEVELOPMENT (Not Applicable)

NAMES OF THE PARTIES TO A JOINT RESEARCH AGREEMENT (Not Applicable)

INCORPORATION BY REFERENCE OF MATERIALS SUBMITTED ON A COMPACT DISC (Not Applicable)

BACKGROUND OF THE INVENTION (1) Field of Invention

The present invention relates to a high pressure, high voltage penetrator assembly, as defined in the preamble of attached claims 1 and 22. Further, the invention relates to a high pressure, high voltage penetrator for use in a penetrator unit of the assembly, as defined in the preamble of claims 14 and 17.

In order to stabilize and increase delivery of hydrocarbon process fluid, such as gas (wet gas) or liquid from a production well, whether subsea or topside, a compressor or pump is usually installed downstream of a coarse liquid separation. The compressor or pump requires a drive motor with a high power rating, usually in a current range of 500-2000 A and a voltage range of 6.6-12 kVAC. Further, in the process of transporting hydrocarbon fluids over long land based distances, flow boosters or pumps are normally required at regular intervals in order for the flow to be stable, irrespective of geographical challenges that may be encountered.

It is important to cool the drive motor, and in doing so the process fluid obtained from the production well is used as a cooling medium. In turn, this implies that the power cables to the motor as well as the penetrator assembly will be exposed to a wet fluid environment at high temperatures, typically in the range of 70° C.-200° C. and at a high pressure in the range of 100-400 bar, in particular for subsea applications.

The fluid which is used for cooling the motor is both wet, as it may contain water, and polluted, as it normally will contain electrically conductive particles and a large variety of other impurities which may lead to electrical flash-over, creep currents and voltage breakdown. In a worst scenario, such operating conditions may lead to ignition of the production gas and explosion, with catastrophic consequences.

Further, during e.g. a wet gas production, a rapid decompression may occur, and as a result devices such as O-rings and electrical insulation which have been exposed to high pressure, may simply explode, giving rise to the risk of fatal breakdown of the compressor or pump subsea installation.

In view of on one hand to require optimum withdrawal of fluid from a production well and therefore the need to increase the pressure therein to expel the fluid from the reservoir, and on the other hand the tough and hazardous environment in which a subsea compressor/pump unit has to work, with related implications if an operation failure is about to happen and is not detected in time to take counter-measures to prevent it happen, has been a headache to the profession and a challenge which has existed for years without a satisfactory solution to overcome the well known operational problems.

It has therefore been a prime object of the present invention to provide a technical solution which will remedy the deficiencies of the prior art solutions or at least reduce the operational hazards to an absolute minimum, thereby gaining operational stability, longer life of the compressor or pump and its motor, and in turn improved cost-benefit rating.

BRIEF SUMMARY OF THE INVENTION

According to the invention, the high pressure, high voltage penetrator assembly, as mentioned in the introductory section, the assembly is upright attachable to a hydrocarbon fluid based wet gas and/or liquid handling compressor or pump, or to/from a transformer, and the assembly comprises:
- a penetrator unit for feed-through of electric power to a compressor or pump motor or to/from a transformer;
- a funnel shaped housing with a housing chamber, the penetrator unit being located at an upper end of the chamber;
- a grid located inside the chamber transversely of a longitudinal axis of the chamber, the penetrator unit being located above the grid,
- a filter located in the chamber below the grid and above an inlet to a housing of the compressor or pump motor or the transformer, and
- a sensor unit extending into the chamber from the penetrator unit and towards from the grid.

According to further embodiments of the penetrator assembly, the grid has a mid-region thereof which is non-penetratable to fluid such as liquid or gas. Electric cables extend to the penetrator and are attached thereat to lead-through pins in the penetrator unit and which extend into the chamber and thereat are connected to electric cables for delivering power to the compressor or pump motor. The electric power cables extend inside the chamber from the penetrator unit through the grid and the filter and into the motor housing to be connected to electric terminals on the compressor or pump motor.

In an embodiment, electric cables extend from a land based installation to the penetrator and are attached thereat to lead-through pins in the penetrator unit, the pins extending into the chamber and thereat are connected to electric cables for delivering power to the compressor or pump motor, and the cables inside the chamber extend from the penetrator unit through the grid and the filter and into the motor housing to be connected to electric terminals on the compressor motor.

Suitably, the filter is composed of ceramic pellets, beads or spheres, although other materials may be suitable.

According to another embodiment of the penetrator assembly, the sensor unit is configured to operate in cooperation with signal processing means external of the assembly, the sensor unit having means for monitoring properties of an environment inside the housing, said means being at least one of: a pressure sensor, a temperature sensor, a fluid level sensor, e.g. for sensing liquid gas, and a sensor for sensing type or types of fluid inside the chamber. Suitably, but not necessarily, the sensor unit comprises all four types of sensors. Although the sensors may be located on the penetrator unit on individual support, it is according to a preferred embodiment that the applied sensors are all located on a common carrier device which extends into the chamber in the space between the penetrator unit and the grid.

In an application, the compressor or pump as well as the penetrator is located downhole in a well.

In order to provide e.g. down-transforming of power voltage subsea, an application of the invention may incorporate electric cables which extend from an installation on the sea surface down to the penetrator and are attached thereat to lead-through pins in the penetrator unit, the pins extending into the chamber and thereat are connected to electric cables for delivering power to a primary side of the transformer, and the cables inside the chamber extend from the penetrator unit through the grid and the filter and into a transformer housing to be connected to electric terminals on the transformer primary side. Further, the electric cables from a secondary side of the transformer extend to an application unit externally of the transformer via another penetrator unit on the transformer. Suitably, to ensure proper cooling of the transformer, the transformer includes a cooling fluid and a cooling fluid pump linked to the transformer primary side.

These and other features of the penetrator assembly will appear from the attached sub-claims 2-13.

Further, in order to accomplish a safe operation of the assembly, it is important that each penetrator in the penetrator unit is able to handle the operational electrical values in practise, as well as the temperature and pressure conditions.

According to the invention, each penetrator comprises:
a cable inlet terminal and a cable outlet terminal, a conductive pin extending between the terminals and engageable at either end with an inlet cable and an outlet cable, respectively in a close engaging fit,
a ceramic sleeve surrounding the terminals and an adjacent part of the conductive pin and the cable thereat,
insulating means which surround at least a substantial length of the conductive pin, wherein said insulating means comprise:
 a bootseal housing with silicone oil or gel therein encompassing the inlet terminal,
 a ceramic deflector, and
 an insulator pressure barrier of glass, ceramic or glass-ceramic material,
 a penetrator attachment sleeve in engagement with the bootseal housing,
 a cable gland device installed on the penetrator attachment sleeve and extending towards the inlet side of the penetrator, the cable gland device providing an internal space adjacent an inlet side of the bootseal housing, said internal space being filled with a silicone oil or gel, and
 a metal body in engagement with the penetrator attachment sleeve, said bootseal housing and the pressure barrier, the metal body surrounding at least a part of said ceramic deflector and said insulator pressure barrier.

According an embodiment of the penetrator, said metal body is made from titanium material or alloy. Further, in order to obtain maximum electric creep distance, at least a part of the metal body is provided on an inside face with glass or ceramic or glass-ceramic material, said material engaging at least a part of the ceramic deflector and the metal body having a flared configuration part facing the outlet terminal of the penetrator.

These and other features of the penetrator will appear from the sub-claims 15 and 16.

A modified type of penetrator comprises:
at least one cable inlet terminal and at least one cable outlet terminal, a conductive pin extending between the terminals and engageable at either end with an inlet cable and an outlet cable, respectively in a close engaging fit, and
insulating means which surrounds at least a substantial length of the conductive pin, said insulating means comprising an insulator pressure barrier of glass, ceramic or glass-ceramic material arranged in a penetrator plate or sleeve.

These and other features of this modified penetrator appear from the sub-claims 18-21.

According to the invention, there is provided a high pressure, high voltage penetrator assembly upright attachable to an operation unit to which power is to be delivered or from which power is to be conveyed, the penetrator assembly comprising:
penetrator unit for feed-through of electric power and/or signals,
a funnel shaped housing with a housing chamber, the penetrator unit being located at an upper end of the chamber;
a grid located inside the chamber transversely of a longitudinal axis of the chamber, the penetrator unit being located above the grid,
a filter located in the chamber below the grid and above an inlet to a housing of the operation unit, and
a sensor unit extending into the chamber from the penetrator unit and towards the grid.

The grid of the penetrator assembly has a mid-region thereof which is non-penetratable to liquid or gas.

Further, the penetrator unit comprises:
a cable inlet terminal and a cable outlet terminal, a conductive pin extending between the terminals and engageable at either end with an inlet cable and an outlet cable, respectively in a close engaging fit,
a ceramic sleeve surrounding the terminals and an adjacent part of the conductive pin and the cable thereat, and
insulating means which surround at least a substantial length of the conductive pin, wherein said insulating means comprise:
 a bootseal housing with silicone oil or gel therein encompassing the inlet terminal,
 a ceramic deflector, and
 an insulator pressure barrier of glass, ceramic or glass-ceramic material,
 a penetrator attachment sleeve in engagement with the bootseal housing,
 a cable gland device installed on the penetrator attachment sleeve and extending towards the inlet side of the penetrator, the cable gland device providing an internal space adjacent an inlet side of the bootseal housing, said internal space being filled with a silicone oil or gel, and
 a metal body in engagement with the penetrator attachment sleeve, said bootseal housing and the pressure barrier, the metal body surrounding at least a part of said ceramic deflector and said insulator pressure barrier.

Said metal body is made from titanium material or alloy, and at least a part of the metal body is provided on an inside face with glass or ceramic or glass-ceramic material, said material engaging at least a part of the ceramic deflector and said metal body having a flared configuration part facing the outlet terminal of the penetrator.

These and other features of the penetrator assembly appear from the sub-claims 27 and 28.

An alternative, much simplified embodiment of the penetrator unit in the penetrator assembly comprises:

at least one cable inlet terminal and at least one cable outlet terminal, a conductive pin extending between the terminals and engageable at either end with an inlet cable and an outlet cable, respectively in a close engaging fit, and insulating means which surrounds at least a substantial length of the conductive pin, said insulating means comprising an insulator pressure barrier of glass, ceramic or glass-ceramic material arranged in a penetrator plate or sleeve attachable to the funnel shaped housing.

A bootseal with silicone oil or gel therein encompasses at least the inlet terminal, and a ceramic sleeve may surround at least one of the terminals and an adjacent part of the conductive pin and the cable thereat. Further, a bootseal housing encompasses the bootseal, and said bootseal housing and said bootseal are located inside a protective housing filled with silicone oil or gel.

Suitably, said penetrator plate or sleeve is made from a titanium material or alloy.

These and other features of the modified penetrator unit appear from the sub-claims 30-34.

Thus, the characteristic features of the invention are defined in the independent claims 1 and 22 and respective sub-claims 2-21 and 23-34.

BRIEF DESCRIPTION OF THE DRAWINGS

The invention is now to be further described with reference to the attached drawings showing non-limitative embodiments of the invention.

DETAILED DESCRIPTION OF THE INVENTION

Figure 1:
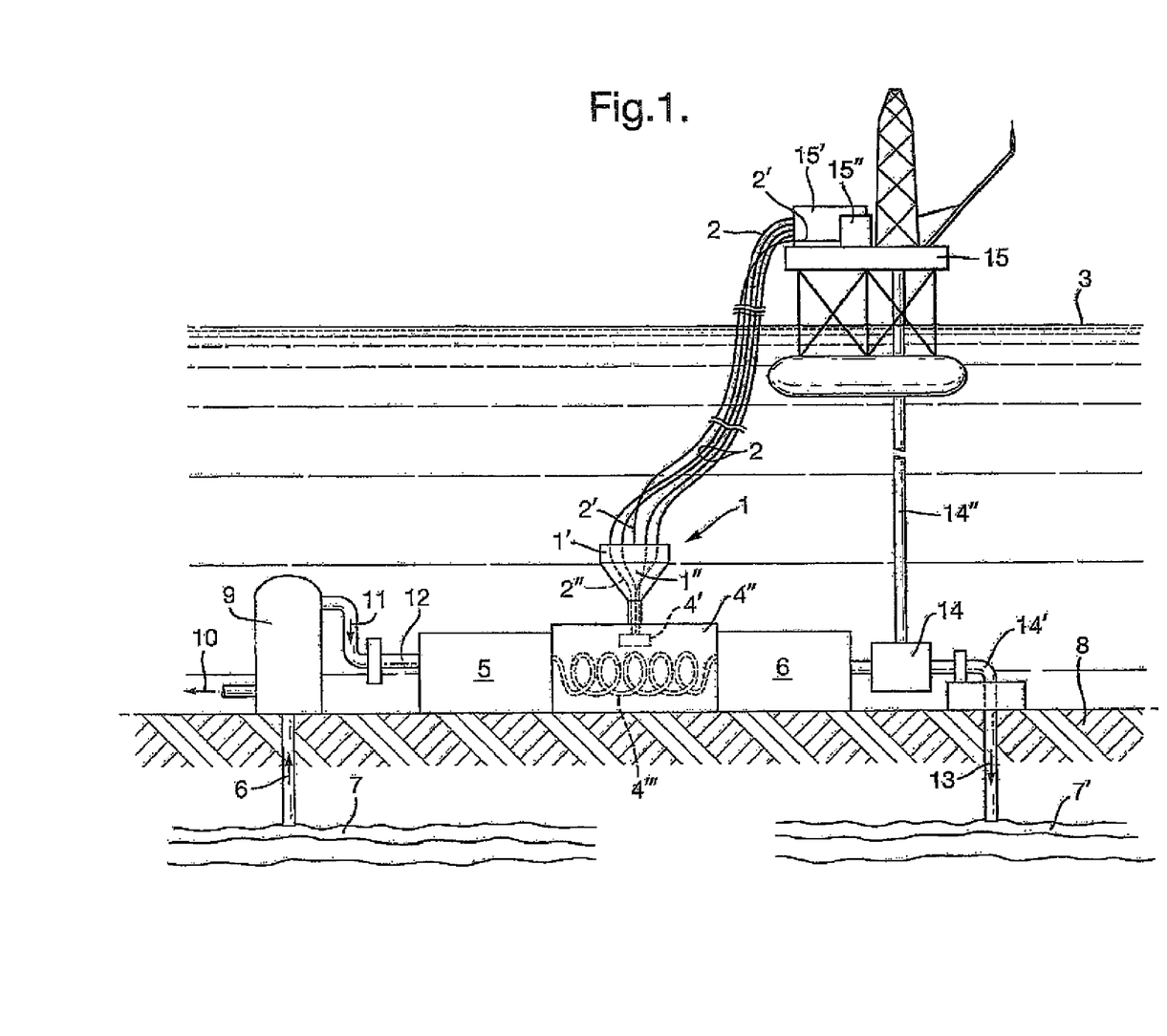
FIG. 1 is a simplified sketch showing an operational subsea environment of the assembly and the penetrator of the invention.

FIG. 1 shows a non-limiting example of a typical working environment of the penetrator assembly 1 with power cables 2 and signal cables 2' extending down from a surface 3' of a sea 3 and the power cables 2 powered by a generator 15' on an offshore installation, e.g an offshore platform 15 (for simplicity not shown to scale relative to a compressor unit 4, 5, 6 on the sea bed 8). The signal cables 2' lead to a signal processing station 15" on the installation 15. The power cables 2 are relayed through the penetrator unit 1' of the assembly 1, and further power cables 2" extend from the penetrator unit 1' through the inside 1" of the assembly down into motor connection terminals 4' inside a housing 4" of a motor 4 which is configured to drive an upstream installed wet fluid compressor or pump 5 and a downstream wet fluid compressor or pump 6.

The compressor or pump 5 receives fluid, e.g. gas 7' from a reservoir 7 below the seabed 8, and the fluid passes through a separator 9 which delivers a fluid condensate, e.g. gas condensate 10 and passes fluid, e.g. gas 11 which is still characterized as somewhat wet fluid through a pipeline 12 into the first compressor or pump 5. From the compressor 5, the compressed or pumped fluid passes through cooling passages 4' in the motor 4 and then further on and through the second compressor or pump 6, and therefrom as pressurized fluid 13, e.g. gas, back to the reservoir 7' via e.g. two-way valve 14 and a pipeline 14'. Whenever the pressure in the reservoir has been sufficiently increased, the valve 14 can be remotely controlled from the installation 15 to switch output flow from the compressor 6 to be directed instead towards the surface via a pipeline 14". Under certain circumstances the pressure in the reservoir may be sufficiently high in order that a direct pipeline down into the reservoir may suffice.

As indicated in the introductory part, the motor 4 is a high power motor, and therefore it is required that the penetrator assembly must be able to withstand the high current and voltage ratings involved, as well as the high temperature and pressure values, and further be able to give alert if operational hazards are imminent and should require immediate shutdown of the compressor or pump unit 4, 5, 6.

As shown on FIG. 1, it is important that the penetrator assembly 1 is positioned upright when attached to the motor housing 4" of the wet gas, subsea gas compressor unit 4, 5, 6.

Variants of the embodiment shown on FIG. 1 is now to be briefly described with reference to FIGS. 5 and 6 in order to illustrate how the present invention can be utilized not only on connection with topside based production wells for hydrocarbon production of fluids such as in gas or liquid form or a combination thereof.

Figure 5:
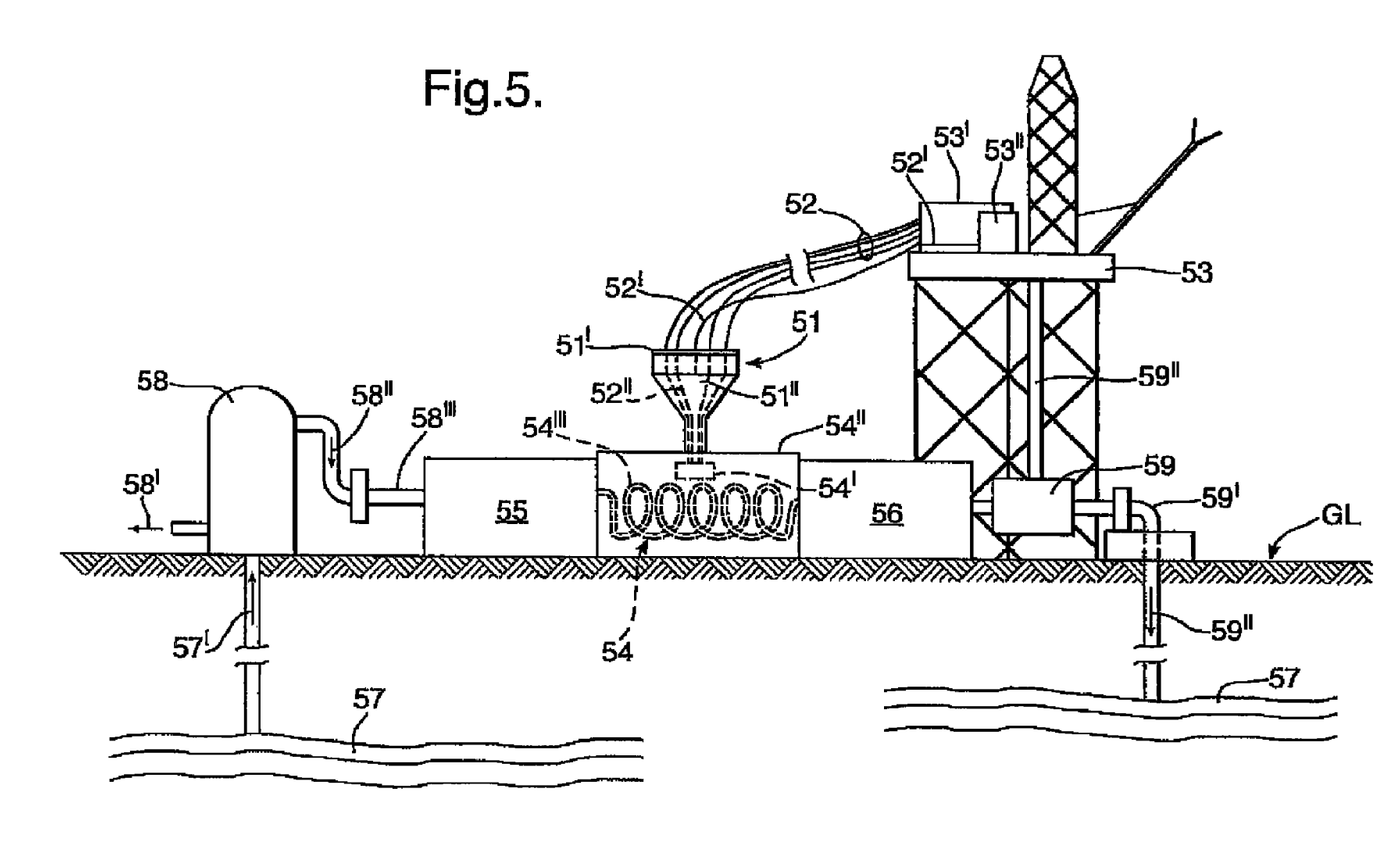
FIG. 5 is a simplified sketch showing an operational topside environment of the assembly and the penetrator of the invention.

FIG. 5 shows another non-limiting example of a typical working environment of a penetrator assembly 51 with power cables 52 and signal cables 52' from an installation 53. The power cables 52 are powered by a generator 53' on a land based installation, e.g. a platform 15 (for simplicity not shown to scale relative to a compressor or pump unit 54, 55, 56). The signal cables 52' lead to a signal processing station 53" on the installation 53. The power cables 52 are relayed through a penetrator unit 51' of the assembly 51, and further power cables 52" extend from the penetrator unit 51' through the inside 51" of the assembly down into motor connection terminals 54' inside a housing 54" of a motor 54 which is configured to drive an upstream installed petroleum fluid compressor or pump 55 and a downstream fluid compressor or pump 56.

The compressor receives fluid 57' from a reservoir 57 below the ground level GL, and the fluid passes through a separator 58 which delivers a fluid condensate 58' and passes fluid 58" which is still characterized as somewhat wet fluid through a pipeline 58''' into the first compressor or pump 55. From the compressor or pump 55, the compressed fluid passes through cooling passages 54''' in the motor 4 and then further on and through the second compressor or pump 56, and therefrom as pressurized fluid 59''' back to the reservoir 57' via e.g. two-way valve 59 and a pipeline 59'. Whenever the pressure in the reservoir has been sufficiently increased, the valve 59 can be remotely controlled from the installation 53 to switch output flow from the compressor or pump 56 to be directed instead towards the installation 53 via the valve 59 and a pipeline 59''''. Under certain circumstances the pressure in the reservoir may be sufficiently high in order that a direct pipeline down into the reservoir may suffice.

As indicated in the introductory part, the motor 54 should be a high power motor, and therefore it is required that the penetrator assembly must be able to withstand the high current and voltage ratings involved, as well as the high temperature and pressure values, and further be able to give alert if operational hazards are imminent and should require immediate shutdown of the compressor or pump unit 54-56.

As shown on FIG. 1, it is important also in the embodiment of FIG. 5 that the penetrator assembly 51 is positioned upright when attached to the motor housing 54'' of the compressor or pump unit 54-56.

Figure 6:
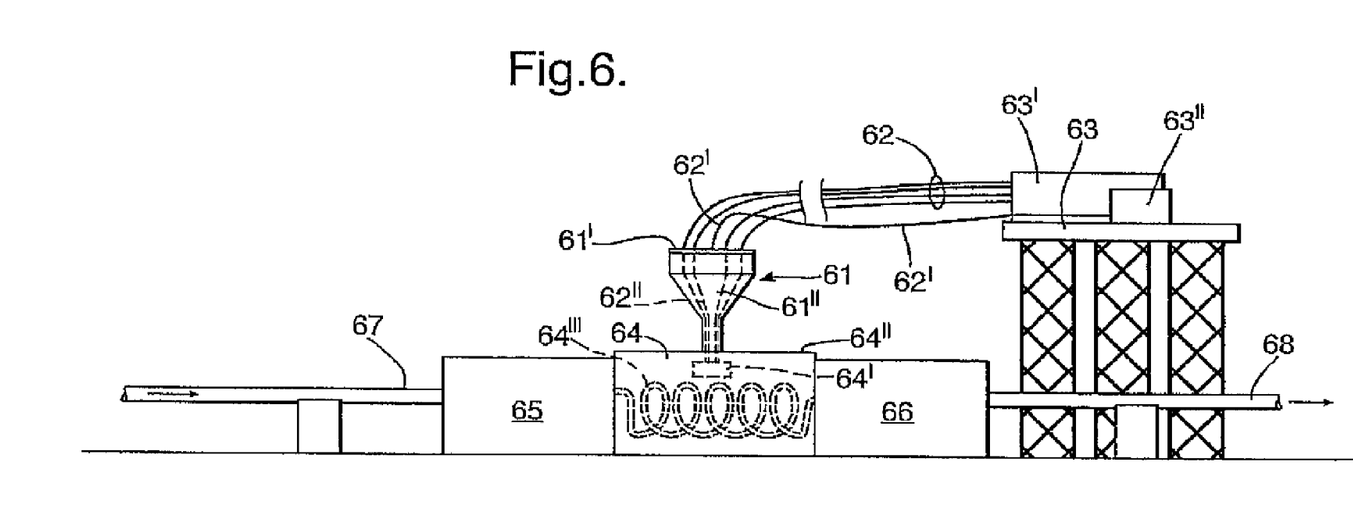
FIG. 6 is a simplified sketch showing an operational land based/terrestrial application of the assembly and the penetrator of the invention for pipeline flow boosting.

FIG. 6 shows a further non-limiting example of a typical working environment of the penetrator assembly 61 with power cables 62 and signal cables 62' extending from an platform or control plant 63, the power cables 2 powered by a generator 63' on platform or plant 63 (for simplicity not shown to scale relative to compressor or pump unit 64-66). The signal cables 62' lead to a signal processing station 63'' on the installation or plant 63. The power cables 62 are relayed through the penetrator unit 61' of the assembly 61, and further power cables 62'' extend from the penetrator unit 61' through the inside 61'' of the assembly down into motor connection terminals 64' inside a housing 64'' of a motor 64 which is configured to drive an upstream installed petroleum fluid compressor or pump 65 and a downstream petroleum fluid compressor or pump 66.

The compressor 65 receives fluid through a fluid pipeline 67 at a specific fluid flow rate and in order to maintain or boost such fluid flow downstream of compressor or pump 66 through pipeline 68, the fluid from pipeline 67 passes into the first compressor or pump 65. From the compressor 5, the compressed fluid passes through cooling passages 64''' in the motor 64 and then further on and through the second compressor or pump 66, and therefrom as pressurized fluid further into the downstream pipeline at maintained or increased fluid pressure and thereby improved fluid flow. As indicated in the introductory part, the motor 64 should be a high power motor, and therefore it is required that the penetrator assembly must be able to withstand the high current and voltage ratings involved, as well as the high temperature and pressure values, and further be able to give alert if operational hazards are imminent and should require immediate shutdown of the compressor or pump unit 64-66.

Figure 7:
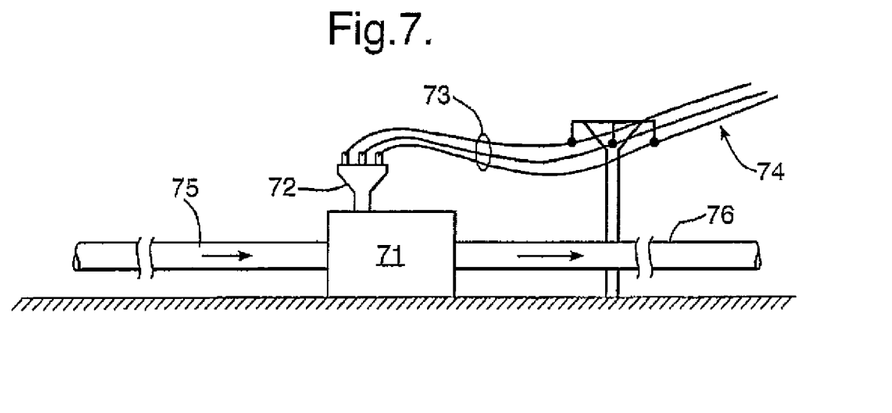
FIG. 7 is simplified sketch showing another operational land based/terrestrial application of the assembly and penetrator of the invention for pipeline flow boosting, in particular for wet gas flow.

FIG. 7 shows a modification of the embodiment of FIG. 6 and is thus a further non-limiting example of a typical working environment of the penetrator assembly 72 interactive with a compressor unit 71 and with power cables 73 extending from power supply lines 74. The compressor has a hydrocarbon fluid input pipeline 75 to the compressor unit 71 and a fluid output pipeline 76 from the unit. The hydrocarbon fluid is suitably wet gas. Such compressor units are in particular useful when conveying hydrocarbon based fluid over long distances, e.g. from Siberia to Europe in order to provide for pressure increases to compensate for pressure loss due to leakages or simply long distances.

Figure 8:
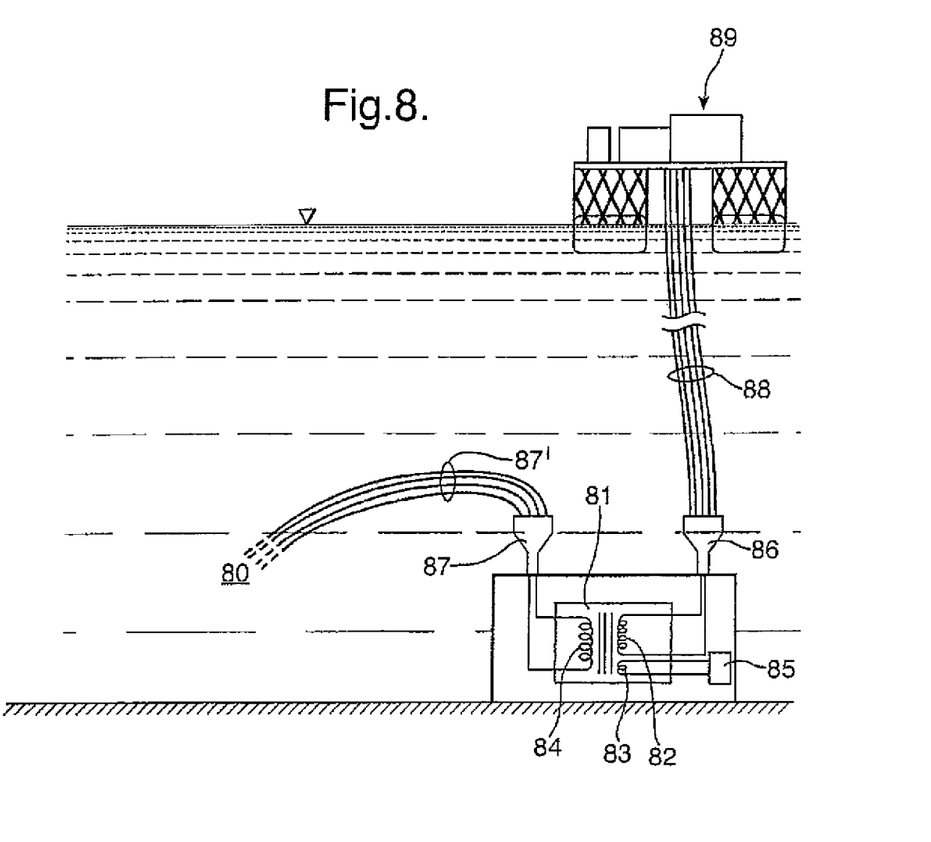
FIG. 8 is a simplified sketch showing an operational mode of the penetrator of the invention for use with a subsea transformer and/or frequency regulator.

FIG. 8 shows an application of the present invention when e.g. power is to delivered to a subsea compressor or pump, symbolically represented by reference 80. Such power could e.g. have a rating of 6 kVAC, whereas power delivered from a topside location, e.g. a floating platform 89 could have a rating of 12 kVAC. It will be appreciated that if power is delivered to a compressor or pump located subsea, a penetrator assembly as disclosed in connection with FIGS. 1-7 will be used to safely deliver power to such compressor or pump. The embodiment on FIG. 8 shows a transformer 81 having a primary side 82 and a secondary side 84, and with an additional power outlet 83 from the transformer to drive a circulation pump 85 for cooling of the transformer with oil or gas. A suitable cooling gas could be $SF_6$. Power is delivered to the transformer primary 82 from the top-side location 89 via power cables 88 through the penetrator assembly 86. Power from the transformer secondary is delivered to a compressor or pump 80 via a penetrator assembly 87 and power cables 87'. Suitably, there may be signal cables associated with the respective cables 87' and 88. Although the transformer 81 for sake of simplicity shows single-phase configuration, it is understood by the expert in the art that a realistic configuration of the transformer would be for transforming three-phase-to-three-phase.

Figure 9:
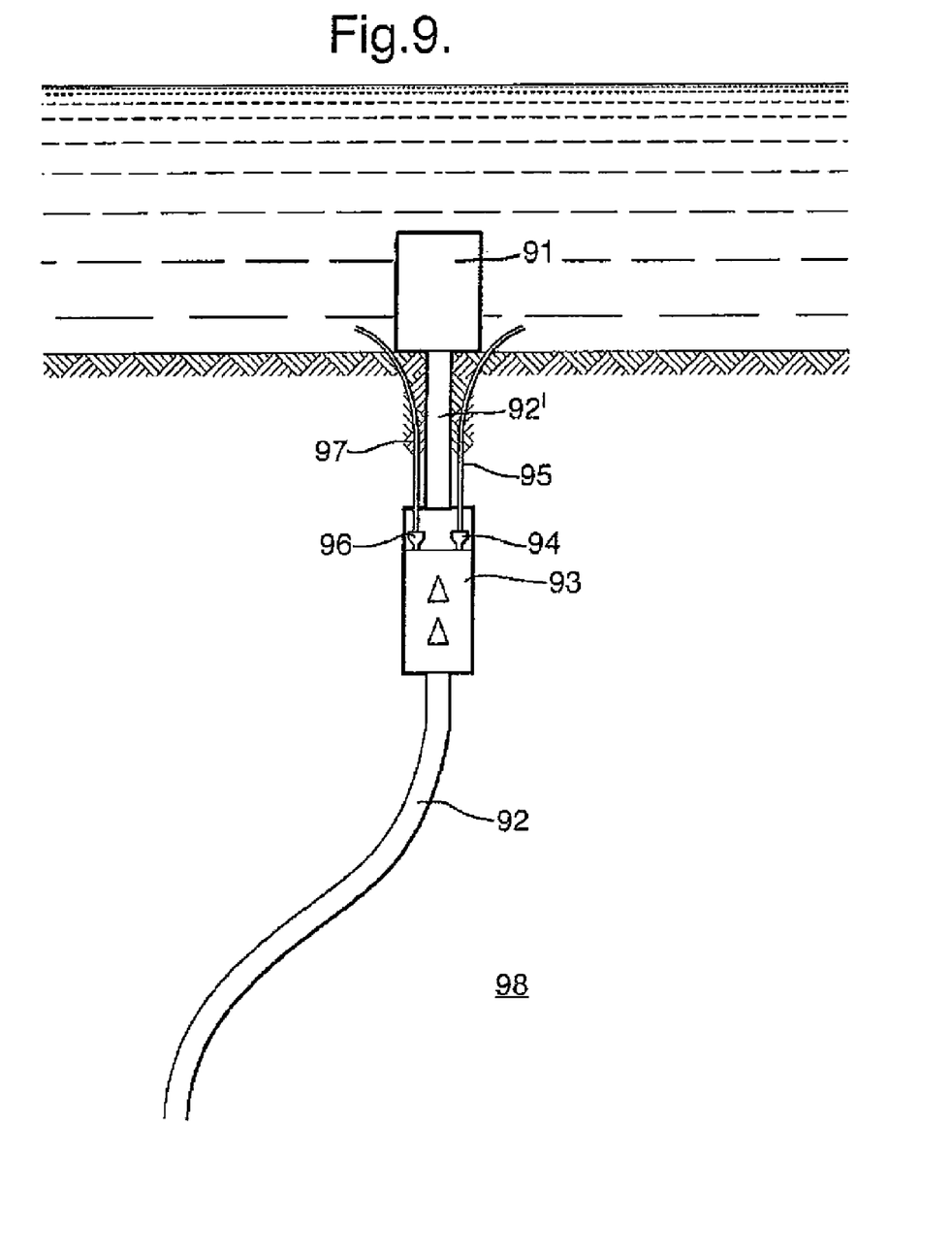
FIG. 9 is a simplified sketch showing an operational mode of the penetrator of the invention for use in connection with a downhole pump or compressor, suitably in interaction with a hydrocarbon fluid "Christmas Tree" (X-mas tree).

FIG. 9 shows another application of the present invention for use in connection with e.g. a so-called Christmas tree 91 used in sub-sea pipeline systems, and e.g. for use with a downhole pump or compressor 93 receiving hydrocarbon fluid via a pipeline 92 and delivering pressure boosted hydrocarbon based fluid to the Christmas tree via an output pipeline 92'. Although a Christmas tree unit has been indicated, other type of fluid distribution units could be visualized. In order to safely deliver power and even provide for signal cabling, penetrator assemblies 94 and 96 are provided with related power cables 95 and 97, respectively. The penetrator assemblies may have provisions for signal lines and which can be included interior of power cable sheathing. Although two penetrators 94, 96 have been shown, only one thereof may be required with associated cables.

As shown on FIGS. 1 and 5, it is important also in the context of the embodiments of FIGS. 6 and 7-9 that the penetrator assembly (61, 72, 86, 87, 94, 96) is positioned upright when attached to any one of: the motor housing 64'' of the unit 64-66, the compressor unit 71, the transformer 81, and the compressor or pump 93.

The penetrator assembly is now to be further described with reference to FIGS. 2 and 3.

Figures 2, 3:
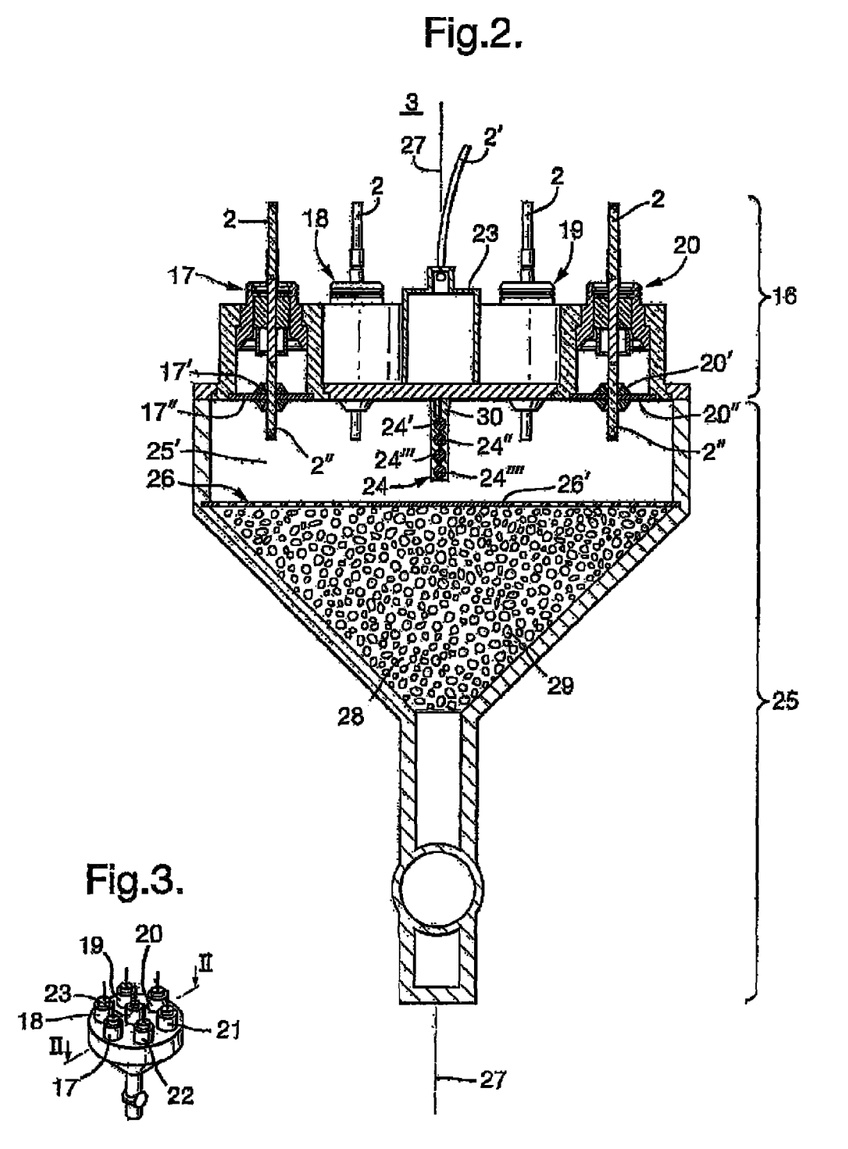
FIG. 2 is a vertical cross-section II-II as seen on FIG. 3 through the penetrator assembly of the invention.
FIG. 3 is a perspective view from above of the penetrator assembly of the invention.

As seen on FIGS. 2 and 3, the assembly comprises a penetrator unit 16 for feed-through of electric power to a compressor motor 4, the unit 16 having in the particular, non-limitative example embodiment a total of six power supply penetrators 17-22 and a penetrator 23 linked to a sensor unit 24. The penetrators 17-22 have each suitably a cable support and holder, as indicated at 17' and 22', attached to ceramic support plate 17''; 20'', respectively. The sensor unit 24 is linked to the signal processing means 15''; 53''; 63'' onboard the installation 15; 53; 63. The operation of the sensor unit is to be explained in further detail later, Further, the penetrator assembly has a funnel shaped housing 25 with a housing chamber 25', and it is noted that the penetrator unit 16 is located at an upper end of the chamber 25'.

A grid 26 is located inside the chamber transversely of a longitudinal axis 27 of the chamber, and it is noted that the penetrator unit 16 is located above the grid 26. The grid has preferably a mid-region 26' thereof which is non-penetratable to liquid or gas, i.e. having no perforations thereat. The purpose of the mid region is to obtain better flow properties inside the chamber 25' and not direct flow towards the sensor 24 from below.

A filter 28 is located in the chamber 25' below the grid and above an inlet to a housing 4"; 54"; 64" of the compressor or pump motor 4; 54; 64. The filter 28 is suitably constituted by a volume of ceramic pellets, beads, tubes or spheres, although other materials and shapes thereof may equally well be suitable if operating in a substantially technically equivalent manner.

As indicated above, the penetrator assembly also comprises the sensor unit 24 which extends into the chamber 25' from the penetrator unit 16 and towards, but spaced from the grid 26, as clearly seen on FIG. 2. The sensor unit 24 is configured to operate in cooperation with said signal processing means 15" external of the assembly via one or more signal cables 2'. The sensor unit has suitably means for monitoring properties of an environment 29 inside the housing 25, and said means are suitably at least one of: a pressure sensor 24', a temperature sensor 24", a liquid gas level sensor 24''', and a sensor 24'''' for sensing type or types of liquid inside the chamber. Suitably, but not necessarily, the sensor unit comprises all four types of sensors. Although the sensors may be located on the penetrator unit on an individual support (not shown), it is according to a preferred embodiment that the applied sensors are all located on a common carrier device 30 which extends into the chamber 25' in a space between the penetrator unit 16 and the grid 26.

The penetrator unit 16 with its penetrators 17-23 are, as noted from FIG. 1, 5 or 6 mounted on top of the chamber 25', thus sealing off the chamber 25' thereat. In the embodiment of FIG. 1, the penetrators of the unit 16 are directly cooled by the sea water 3. The motor as well as the compressors or pumps are of course also to a certain extent cooled by the surrounding sea water, as is also the housing 25 and thereby its interior 25'. In the embodiments shown on FIGS. 5 and 6, dedicated cooling units (not to shown) which surround the penetrators and the compressor or pump units may be required in order to obtain sufficient cooling. In regional areas where the air temperature is very low most of the year or during substantial parts of the year, artificial cooling from cooling units need not to run all year. If water from nearby wells or rivers is available, such water may aid the artificial cooling as required.

Sealing O-rings 45 and C-ring 46 are provided. The references numerals 47 and 48 indicate the cable insulation on the inlet cable 2; 52; 62 and the outlet cable 2"; 52"; 62".

It is quite important that the penetrator assembly is mounted so that the unit 16 and the funnel shaped housing 25 will have its longitudinal axis 27 substantially upright, preferably vertical if possible. Therefore care should be made to have the compressor or pump unit 4, 5, 6 properly placed on the sea bed 8 to make such vertical positioning possible. Also, a land based installation such as indicated schematically on FIGS. 5 and 6 should have such vertical positioning as a prerequisite. This aspect is important in the sense that as an outset no fluid will flow into the chamber. The fluid, e.g. wet gas which runs along and meet cables inside the motor housing will, due to the high pressures involved meet the cables at the inside or high pressure side of the chamber 25'. This will, however, be a high pressure "dead end" chamber part with little or no circulation of petroleum based fluid, e.g. wet gas.

The filter 28 of e.g. ceramic pellets act as filter against any electrically conductive particles carried along with the fluid, e.g. wet gas and will also function as a flame arrester in case an explosion should occur in the motor.

In order to avoid decompression explosion of organic materials which are normally exposed to high pressure conditions, such as e.g. O-rings, washers and electrical insulating materials, the use of organic materials should be avoided to the extent possible. Thus, it would be preferable to limit the use of organic materials just to cable insulation materials. All other materials connected to high voltage carrying parts of the penetrators and the penetrator unit as such are suitably made from one or more of glass materials, ceramic materials and glass-ceramic materials. Further, silicone type materials may be used for insulation purposes.

Since a connection between a penetrator, e.g. penetrator 17 and a cable, e.g. cable 2"; 52"; 62" is an "open" structure, i.e. only secured by ceramic deflectors and a long electrical creep current distance, it is important that fluid in the form of liquid is prevented from coming into contact any electrically conductive part in this region of the penetrator assembly.

Related to the non-limiting example of FIG. 1, in case the motor 4 and its housing 4" is through operational failure is filled with liquid, such as sea water and/or gas condensate, at sea bed level, and the motor is started, the prevailing pressure will force the liquid to flow to the top of the motor. Fluid in the form of gas inside the chamber will consequently be compressed by the liquid level rising in the chamber 25'. Preferably, the volume of the chamber 25' is approximately ten times a volume needed to keep the penetrators 17-22 dry. Thus, the pressure 29 inside the chamber 25' may rise by a factor of 10 before the liquid level reaches a state of equilibrium with the compressed gas inside the chamber.

However, should the liquid level rise to a potential critical value, the sensors 24''' and 24'''' will react, thus causing an alarm to initiate that operations are halted until a more normal pressure situation is present.

The sensors 24', 24''' and 24'''' may suitably be of a capacitive type, although other sensor types to measure pressure, liquid level and liquid properties may be visualized. The temperature sensor 24" is suitably of a conventional type.

The sensor unit is important to detect excessive temperatures which could cause thermal breakthrough, or if the liquid level inside the chamber 25' rises to a level above an operational critical level.

Figure 4:
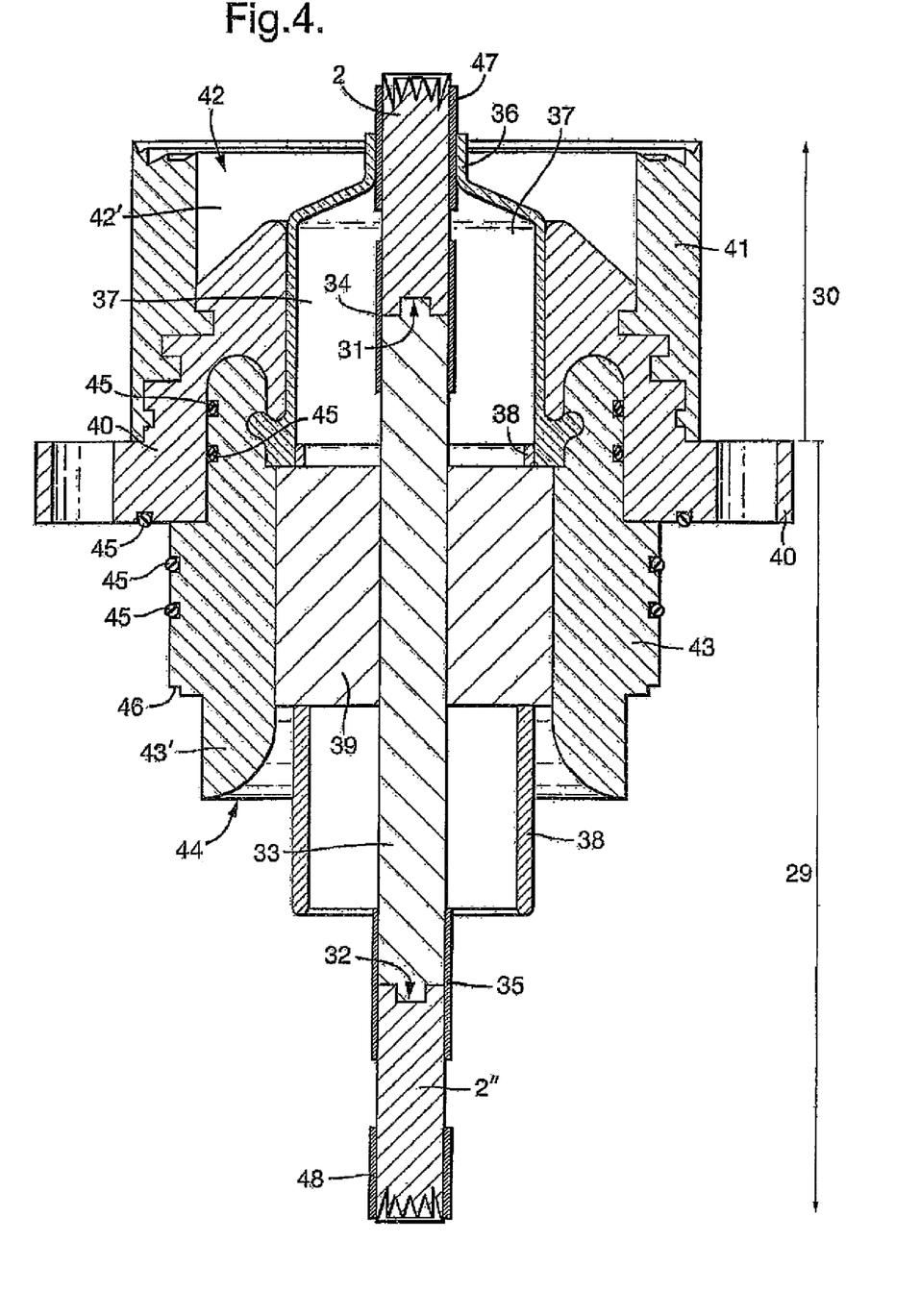
FIG. 4 is a typical penetrator structure according to the invention.

It should be pointed out that the penetrators could have a configuration as generally outlined on FIG. 2, or a configuration as shown in more detail on FIG. 4.

In view of the fact that the compressor or pump unit with its penetrator unit can in some applications be placed on a seabed at a substantial sea depth, e.g. at 250 meters, it is appreciated that the pressure at such depth is at 25 bar.

With reference to the embodiment of FIG. 1, the motor 4 of the compressor or pump unit 4, 5, 6 may e.g. have a test pressure of 440 bar, although its operational pressure would normally be a maximum of e.g. 220 bar. It is important to note that the fluid, e.g. gas delivered from the compressor or pump 5 will circulate about the windings of the motor 4 at the outlet pressure from the compressor 5. Similar ratings may apply to the embodiments of FIGS. 5 and 6, although operational pressures could be lower.

Prior to lowering the compressor unit onto the seabed, it would be preferable to fill the motor with a gas having a pressure in excess of the outside pressure at the bottom of the sea, in this example e.g. a pressure of 30 bar, which will be the start pressure inside the chamber 25' also.

The references 30 and 29 on FIG. 4 point to and define what parts of the penetrator are exposed to the surrounding sea environment 3 and what parts are exposed to the environment inside the housing 25, respectively. Thus, the reference 30 could in the context of FIGS. 5 and 6 refer to surrounding air or coolant environment.

In a possible modification with a fluid such as wet gas, it could be considered having heating elements inside the chamber for drying the gas or causing wet gas inside the chamber to condensate or for causing the wet gas to leave the chamber.

As indicated above, in order to accomplish a safe operation of the assembly, it is important that each high voltage penetrator 17-22 in the penetrator unit 16 is able to handle the operational electrical values in practise, as well as the temperature and pressure conditions. A typical, though not limitative example embodiment of a high voltage penetrator is shown on FIG. 4. The penetrator comprises a cable inlet terminal 31 and a cable outlet terminal 32, a conductive pin 33 at either end forming and extending between the terminals 31 and 32 and engageable at said either end with an inlet cable 2 and an outlet cable 2", respectively in a close engaging fit. A ceramic sleeve 34, 35 surrounds the respective terminals 31, 32 and an adjacent part of the conductive pin 33 and the cable 2; 2" thereat. Insulating means are provided to surround at least a substantial length of the conductive pin 33. The insulating means may suitably comprise a bootseal housing 36 with silicone oil or gel 37 therein encompassing the inlet terminal 31; a ceramic deflector 38, and an insulator pressure barrier 39 of glass, ceramic or glass-ceramic material. Further, there is a penetrator attachment sleeve 40 in engagement with the bootseal housing 36. A cable gland device is 41 installed on the sleeve 40 and extends towards the cable inlet side of the penetrator. The cable gland device 41 provides an internal space 42' adjacent an inlet side of the bootseal housing 36, said internal space being filled with a silicone oil or gel 42'. A metal body 43 is in engagement with the penetrator attachment sleeve 40, said bootseal housing 36 and the pressure barrier 39, the metal body 43 surrounding at least a part of said ceramic deflector 38 and said insulator pressure barrier 39.

The metal body is suitably made from titanium material, e.g. titanium group 5. However, titanium alloys or other suitable materials with similar operational properties to titanium when operating under the prevailing operating conditions, may be used instead. Further, in order to obtain maximum electric current creep distance, at least a part of the metal body is covered on an inside face with glass or ceramic or glass-ceramic material 44, said material engaging at least a part of the ceramic deflector 38 and the metal body 43 having a flared configuration part 43' facing the outlet terminal 32 of the penetrator.

Figure 10:
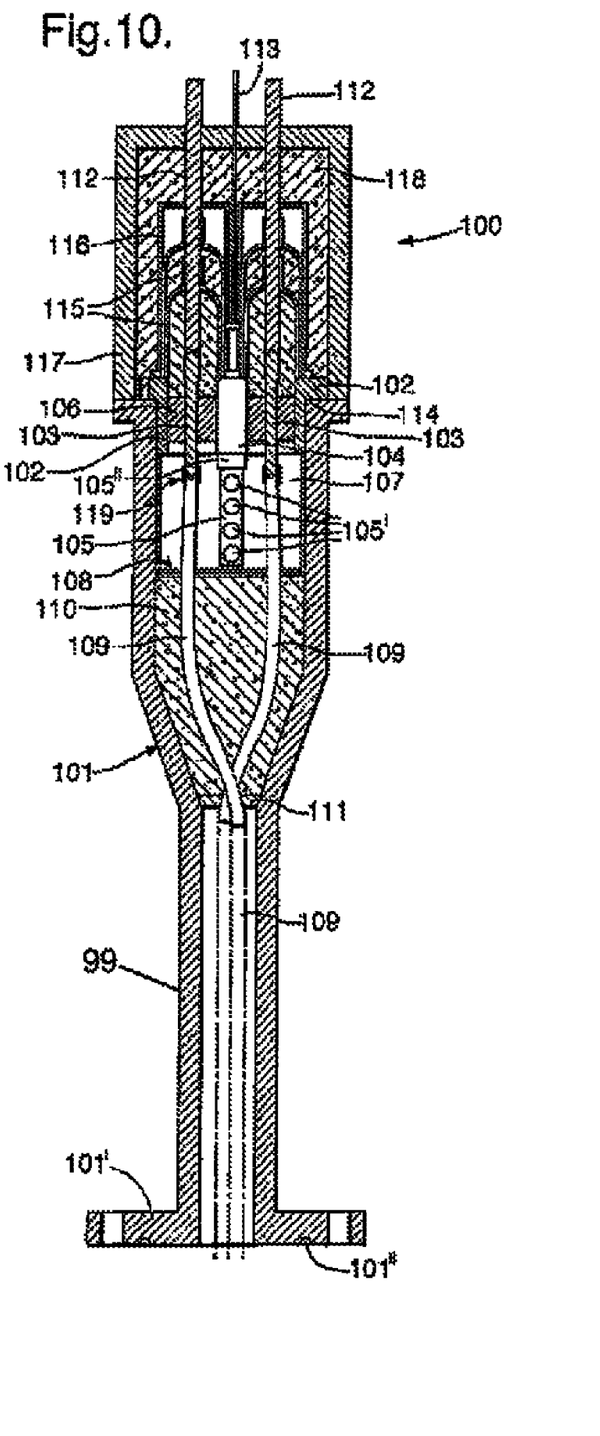
FIG. 10 is a modification of the penetrator assembly of FIG. 2 and showing a vertical cross-section through the modified penetrator assembly of the invention.

The modified embodiment of the penetrator assembly, as shown on FIG. 10, will work along the same principles as the embodiment of FIG. 2. However, this modified embodiment offers in some aspects a more simplified structure, in particular from point of view of manufacturing the penetrator assembly. Its field of use will be the same or similar to that of FIG. 2. The use and general description of such a modified penetrator assembly or unit 100 will be the same as shown and described above for the penetrator assembly or unit mentioned thereat in connection with FIGS. 1 and 5-9, and will need no repetition.

As shown on FIGS. 1 and 5-9, it is important that also the modified penetrator assembly 100 is positioned upright when attached to e.g. one of the motor housing 64" of the unit 64-66, the compressor unit 71, the transformer 81, and the compressor or pump 93, respectively.

The penetrator assembly is now to be further described with reference to FIG. 10. As seen on FIG. 10, the that the assembly comprises a funnel shaped housing 101. A penetrator plate or sleeve 102 is sealingly secured to an upper mouth of the housing 101, e.g. by bolt attachment or by welding.

On its narrow end, the funnel shaped housing 101 comprises a cable guiding passage interconnection piece 99. The cable guiding passage interconnection piece 99 can either be formed in one piece with the funnel shaped housing 101, or it can be a separate, individual part, connected in between the funnel shaped housing 101 and the subsea equipment vessel wall. In the latter case, the cable guiding passage interconnection piece 99 is connected to or formed with a flange 101'. If the cable guiding passage interconnection piece 99 is formed in one piece with the funnel shaped housing 101, the flange 101' is provided on the narrow end of the funnel shaped housing 101, as described further below. In this case the narrow portion of the funnel shaped housing 101 defines the cable guiding passage interconnection piece 99.

Said interconnection piece 99 preferably comprises a material which is temperature compatible with the subsea equipment vessel wall in regard to the thermal expansion coefficients through a scheduled operating temperature range.

Said interconnection piece 99 preferably has a cross section that is smaller than the diameter of the housing.

A protective outer housing or casing 117, the funnel shaped housing 101 and/or interconnection piece 99 have a surface area and shape so as to enable heat transfer from sea water and thereby permit cooling of the outer housing 117 and the funnel shaped housing 101 and interconnection piece 99, and thus comprise external passive cooling means.

High voltage, high current lead-through pins 103 as well as cable lead-through member 104 extend through the penetrator plate or sleeve 102. The member 104 provides for connection to a sensor unit 105 which is of the same type as the unit 24 disclosed in connection with FIG. 2. The pins 103 and the member 104 are sealingly attached to the penetrator plate or sleeve 102 using a glass material, a ceramic material or a glass-ceramic material 106. Compared with the embodiment of FIG. 2 which has a more complex structure for attaching lead-through pins, the mere attachment of the pins 103 and the member 104 directly to the penetrator plate or sleeve 102 yields a highly simplified and cost-effective, yet fully reliable penetrator assembly. The sensor unit 105 is located in a chamber 107, and a grid 108 separates the chamber 107 from a filter section 110, as well also serves as cable support for cables 109. The cables 109 are configured to convey power to e.g. a compressor motor or a pump or other equipment, and to and from a transformer. The member 104 may be comprised of a metal tubing, e.g. of titanium material or titanium alloy or stainless steel through which signal conductors extend, e.g. embedded in an insulation material such as glass, ceramic material or glass ceramic material.

At the bottom of the filter section 110 there is located a perforated plate 111, suitably made of ceramic material, and through which the cables 109 may pass. The perforations in the grid 108 as well as the plate 111 are sufficiently small in order not to let any of the filter material pass through the grid 108 and/or the plate 11. In the example shown on FIG. 10, just two cables 109 connected to cables 112 via the pins 103 have been shown. It will however be appreciated that more than two cables 109, two cables 112 and interconnecting pins 103 could be used. Thus, the number of such structural elements could be e.g. three, four, five or six, or in some cases even more.

The operation of the sensor unit is to be briefly explained in further detail later, It is noted that the penetrator plate or sleeve 102 with the pins 103 and the member 104 secured thereto are located at an upper end of the chamber 107.

The grid 108 is located inside the chamber 107 transversely of a longitudinal axis of the chamber. The grid may at a mid-region thereof be non-penetratable to liquid or gas, i.e.

having no perforations thereat. The purpose of the mid region is to obtain better flow properties inside the chamber 107 and not direct flow towards the sensor 105 from below.

The filter 110 is located in the chamber 107 below the grid 108 and above an inlet to a housing of a compressor, a pump motor, a transformer or other operational unit. The filter 110 is suitably constituted by a volume of ceramic pellets, beads, tubes or spheres, although other materials and shapes thereof may equally well be suitable if operating in a substantially technically equivalent manner.

As indicated above, the penetrator assembly also comprises the sensor unit 105 and its attached lead-through member 104. The sensor unit 105 extends into the chamber 107 from the location of the penetrator plate or sleeve 102 and towards the grid 108. The sensor unit 105 is suitably spaced from the grid 108, but may in some cases be close to the grid or slightly touch it. The sensor unit 105 is configured to operate in cooperation with said signal processing means, such as the signal processing means 15" previously described external of the assembly via one or more signal cables 113. The sensor unit 105 has suitably means for monitoring properties of an environment inside the housing 101, and said means 105' are suitably at least one of: a pressure sensor, a temperature sensor, a liquid gas level sensor, and a sensor for sensing type or types of liquid inside the chamber. Suitably, but not necessarily, the sensor unit comprises all four types of sensors. Although the sensors may be located on the penetrator unit on an individual support (not shown), it is according to a preferred embodiment that the applied sensors are all located on a common carrier device 105' which extends into the chamber 107 in a space between the penetrator plate or sleeve 102 and the grid 108.

The penetrator unit with its penetrating pins 103 and the member 104 is mounted on top of the chamber 107, thus sealing off the chamber 107 thereat. Cooling of the penetrator assembly is dependent on the environment in which it operates. This issue has been discussed earlier in this disclosure and is not repeated.

Sealing O-rings 114 may or may not be required, dependent on how the penetrator plate or sleeve 102 is secured to the funnel 101. The references numeral 115 indicates cable insulation on the cables 112, the insulation being in the form of bootseals. The bootseals are suitably filled with silicone oil or gel. The bootseals 115 are suitably located inside a bootseal housing 116. A protective outer housing or casing 117 is provided, suitably filled with a silicone fluid, such as silicone oil or gel 118.

The bottom end of the funnel 101 is suitably provided with an attachment flange 101' for attachment to e.g. a motor housing, a pump housing, a transformer housing or other housing of an operational device. The flange 101' has a recess for accommodation of a sealing O-ring or other sealing means.

As previously mentioned, it is quite important that the penetrator assembly is mounted so that it will have its longitudinal axis substantially upright, preferably vertical if possible. Therefore care should be made to have e.g. a compressor or a pump unit to which the assembly is attached properly placed to make such vertical positioning possible. Also, a land based installation should have such vertical positioning as a prerequisite. This aspect is important in the sense that as an outset no fluid will flow into the chamber. The fluid, e.g. wet gas which runs along and meet cables inside a motor housing will, due to the high pressures involved meet the cables at the inside or high pressure side of the chamber 107. This will, however, be a high pressure "dead end" chamber part with little or no circulation of petroleum based fluid, e.g. wet gas.

The filter 110 of e.g. ceramic pellets act as filter against any electrically conductive particles carried along with a fluid, e.g. wet gas and will also function as a flame arrester in case an explosion should occur in e.g. a motor.

As stated earlier in the disclosure, in order to avoid decompression explosion of organic materials which are normally exposed to high pressure conditions, such as e.g. O-rings, washers and electrical insulating materials, the use of organic materials should be avoided to the extent possible. The present modified version of the penetrator assembly effectively reduces such hazards as the use of organic materials is reduced to absolute minimum, i.e. just the use of organic materials as regards cable insulation materials. All other materials connected to high voltage carrying parts of the penetrators and the penetrator unit as such are suitably made from one or more of glass materials, ceramic materials and glass-ceramic materials. Further, silicone type of materials may be used for insulation purposes.

Since a connection between a penetrator, e.g. pin 103 and a cable, e.g. cable 109, is an "open" structure, it is important that fluid in the form of liquid is prevented from coming into contact any electrically conductive part in this region of the penetrator assembly. A ceramic sleeve 119 may encompass a contact region between the pin 103 and the cable 109.

The aspects of the operation, the environments and the properties and features of the penetrator assembly, as e.g. explained in connection with FIGS. 1 and 5-9 apply also equally well to the modified penetrator assembly as shown on FIG. 10, and the explanation of such operation is therefore not repeated. Thus, the operation and properties as explained for e.g. the sensor unit 24 are the same as for the sensor unit 105.

It may be noted that the structure as disclosed in connection with FIG. 4 is not present in the embodiment of FIG. 10, thus rendering the structure of FIG. 10 a more simplified version of the penetrator assembly.

As indicated above, the funnel body 101 is suitably made from titanium material or alloy or steel. A suitable titanium material would be e.g. titanium group 5. As regards steel, stainless steel would be preferable. However, other suitable materials with similar operational properties to titanium when operating under the prevailing operating conditions, may be used instead. The same materials could also be useful for the penetrator plate 102 and the housing or casing 117, as well as for other metallic parts used in the penetrator assembly

The invention claimed is:
1. A high pressure, high voltage penetrator assembly configured for subsea use, downhole use, topside use or land based use,
   wherein the assembly is configured to be upright attachable to a hydrocarbon fluid based wet gas or liquid handling compressor or pump, or attachable to or from a transformer, and
   wherein the assembly comprises:
      a penetrator unit for feed-through of electric power to a compressor or pump motor, or to and from the transformer;
      a funnel shaped housing with a housing chamber, the penetrator unit being located at an upper end of the housing chamber;
      a grid located inside the housing chamber transversely of a longitudinal axis of the chamber, the penetrator unit being located above the grid,
      a filter located in the housing chamber below the grid and above an inlet to a housing of the compressor or pump motor or the transformer, and a sensor unit extending into the housing chamber from the penetrator unit and towards the grid.

2. The penetrator assembly according to claim 1, wherein the grid has a mid-region thereof which is non-penetratable to liquid or gas.

3. The penetrator assembly according to claim 1, wherein electric cables extend from an installation on a sea surface down to the penetrator unit and are attached thereat to lead-through pins in the penetrator unit, the pins extending into the housing chamber and thereat are connected to the electric cables for delivering power to the compressor or pump motor, and wherein the cables inside the housing chamber extend from the penetrator unit through the grid and the filter and into the motor housing to be connected to electric terminals on the compressor motor.

4. The penetrator assembly according to claim 1, wherein electric cables extend from a land based installation to the penetrator unit and are attached thereat to lead-through pins in the penetrator unit, the pins extending into the housing chamber and thereat are connected to the electric cables for delivering power to the compressor or pump motor, and wherein the electric cables inside the housing chamber extend from the penetrator unit through the grid and the filter and into the motor housing to be connected to electric terminals on the compressor motor.

5. The penetrator assembly according claim 1, wherein the filter is composed of a volume of ceramic pellets, beads, tubes or spheres.

6. The penetrator assembly according to claim 1, wherein the sensor unit is configured to operate in cooperation with signal processing means external of the assembly, the sensor unit having means for monitoring properties of an environment inside the funnel shaped housing, said means being at least one of: a pressure sensor, a temperature sensor, a liquid gas level sensor, and a sensor for sensing type or types of liquid inside the chamber.

7. The penetrator assembly according to claim 6, wherein the sensor unit comprises all four types of sensors located on a common carrier device which extends into a space between the penetrator unit and the grid.

8. The penetrator assembly according to claim 1, wherein the sensor unit extends towards, but is spaced from an upper surface of the grid.

9. The penetrator assembly according to claim 1, wherein the compressor or pump as well as the penetrator is located downhole in a well.

10. The penetrator assembly according to claim 1, wherein electric cables extend from an installation on a sea surface down to the penetrator unit and are attached thereat to lead-through pins in the penetrator unit, the pins extending into the housing chamber and thereat are connected to the electric cables for delivering power to a primary side of the transformer, and wherein the electric cables inside the housing chamber extend from the penetrator unit through the grid and the filter and into a transformer housing to be connected to electric terminals on a primary side of the transformer.

11. The penetrator assembly according to claim 10, wherein the electric cables from a secondary side of the transformer extend to an application unit externally of the transformer via another penetrator unit on the transformer.

12. The penetrator assembly according to claim 10, wherein the transformer includes a cooling fluid and a cooling fluid pump linked to the transformer primary side.

13. The penetrator assembly according to claim 1, wherein at least the funnel shaped housing is made from a titanium material or alloy.

14. A high pressure, high voltage penetrator for use in the penetrator unit of the penetrator assembly according to claim 1, wherein the penetrator comprises:
a cable inlet terminal and a cable outlet terminal, a conductive pin extending between the terminals and engageable at either end with an inlet cable and an outlet cable, respectively in a close engaging fit,
a ceramic sleeve surrounding the terminals and an adjacent part of the conductive pin and the cable thereat,
insulating means which surround at least a substantial length of the conductive pin, wherein said insulating means comprise:
a bootseal housing with silicone oil or gel therein encompassing the inlet terminal,
a ceramic deflector, and
an insulator pressure barrier of glass, ceramic or glass-ceramic material,
a penetrator attachment sleeve in engagement with the bootseal housing,
a cable gland device installed on the penetrator attachment sleeve and extending towards an inlet side of the penetrator unit, the cable gland device providing an internal space adjacent an inlet side of the bootseal housing, said internal space being filled with a silicone oil or gel, and
a metal body in engagement with the penetrator attachment sleeve, said bootseal housing and said insulator pressure barrier, the metal body surrounding at least a part of said ceramic deflector and said insulator pressure barrier.

15. The penetrator according to claim 14, wherein said metal body is made from a titanium material or alloy.

16. The penetrator according to claim 15, wherein at least a part of the metal body is provided on an inside face with glass or ceramic or glass-ceramic material, said material engaging at least a part of the ceramic deflector and said metal body having a flared configuration part facing the outlet terminal of the penetrator.

17. The penetrator according to claim 14, wherein at least a part of the metal body is provided on an inside face with glass or ceramic or glass-ceramic material, said material engaging at least a part of the ceramic deflector and said metal body having a flared configuration part facing the outlet terminal of the penetrator unit.

18. A high pressure, high voltage penetrator for use in the penetrator unit of the penetrator assembly according to claim 1, wherein the high voltage penetrator comprises:
a cable inlet terminal and a cable outlet terminal, a conductive pin extending between the terminals and engageable at either end with an inlet cable and an outlet cable, respectively in a close engaging fit, and
insulating means which surrounds at least a substantial length of the conductive pin, wherein said insulating means comprises an insulator pressure barrier of glass, ceramic or glass-ceramic material arranged in a penetrator plate or sleeve.

19. The penetrator according to claim 18, wherein a bootseal with silicone oil or gel therein encompasses at least the inlet terminal.

20. The penetrator according to claim 19, wherein a bootseal housing encompasses the bootseal.

21. The penetrator according to claim 20, wherein said bootseal housing and said bootseal are located inside a protective housing filled with silicone oil or gel.

22. The penetrator according to claim 18, wherein a ceramic sleeve surrounds at least one of the terminals and an adjacent part of the conductive pin and the cable thereat.

23. A high pressure, high voltage penetrator assembly upright attachable to an operation unit to which power is to be delivered or from which power is to be conveyed, the penetrator assembly comprising:
- penetrator unit for feed-through of electric power or signals,
- a funnel shaped housing with a housing chamber, the penetrator unit being located at an upper end of the chamber;
- a grid located inside the chamber transversely of a longitudinal axis of the chamber, the penetrator unit being located above the grid,
- a filter located in the chamber below the grid and above an inlet to a housing of the operation unit, and
- a sensor unit extending into the chamber from the penetrator unit and towards the grid.

24. The penetrator assembly according to claim 23, wherein the grid has a mid-region thereof which is non-penetratable to liquid or gas.

25. The penetrator assembly according to claim 23, wherein the sensor extends towards the grid, but is spaced from a top surface thereof.

26. The penetrator assembly according to claim 23, wherein at least the funnel shaped housing is made from a titanium material or alloy.

27. The penetrator assembly according to claim 23, wherein the penetrator unit has an inlet side and further comprises:
- a cable inlet terminal and a cable outlet terminal, a conductive pin extending between the inlet and out terminals and having opposite ends and engageable at either of said opposite ends with an inlet cable and an outlet cable, respectively in a close engaging fit,
- a ceramic sleeve surrounding the terminals and an adjacent part of the conductive pin and the cable thereat, and
- insulating means which surround at least a substantial length of the conductive pin, wherein said insulating means comprise:
  - a bootseal housing with silicone oil or gel therein encompassing the inlet terminal,
  - a ceramic deflector, and
  - an insulator pressure barrier of glass, ceramic or glass-ceramic material,
  - a penetrator attachment sleeve in engagement with the bootseal housing,
  - a cable gland device installed on the penetrator attachment sleeve and extending towards the inlet side of the penetrator unit, the cable gland device providing an internal space adjacent an inlet side of the bootseal housing, said internal space being filled with a silicone oil or gel, and
  - a metal body in engagement with the penetrator attachment sleeve, said bootseal housing and said insulator pressure barrier, the metal body surrounding at least a part of said ceramic deflector and said insulator pressure barrier.

28. The penetrator assembly according to claim 27, wherein said metal body is made from a titanium material or alloy.

29. The penetrator assembly according to claim 28, wherein at least a part of the metal body is provided on an inside face with glass or ceramic or glass-ceramic material, said material engaging at least a part of the ceramic deflector and said metal body having a flared configuration part facing the outlet terminal of the penetrator.

30. The penetrator assembly according to claim 27, wherein at least a part of the metal body is provided on an inside face with glass or ceramic or glass-ceramic material, said material engaging at least a part of the ceramic deflector and said metal body having a flared configuration part facing the outlet terminal of the penetrator.

31. The penetrator assembly according to claim 23, wherein the penetrator unit comprises:
- at least one cable inlet terminal and at least one cable outlet terminal, a conductive pin extending between the terminals and engageable at either end with an inlet cable and an outlet cable, respectively in a close engaging fit, and
- insulating means which surrounds at least a substantial length of the conductive pin, said insulating means comprising an insulator pressure barrier of glass, ceramic or glass-ceramic material arranged in a penetrator plate or sleeve attachable to the funnel shaped housing.

32. The penetrator assembly according to claim 31, wherein a bootseal with silicone oil or gel therein encompasses at least the inlet terminal.

33. The penetrator assembly according to claim 32, wherein a bootseal housing encompasses the bootseal.

34. The penetrator assembly according to claim 33, wherein said bootseal housing and said bootseal are located inside a protective housing filled with silicone oil or gel.

35. The penetrator assembly according to claim 31, wherein a ceramic sleeve surrounds at least one of the terminals and an adjacent part of the conductive pin and the cable thereat.

36. The penetrator assembly according to claim 31, wherein said penetrator unit includes a penetrator plate and the penetrator plate or ceramic sleeve is made from a titanium material or alloy.

37. High pressure, high temperature, high voltage penetrator assembly (100) is attachable to a subsea equipment vessel wall, the penetrator assembly comprising:
- a cable guiding passage interconnection piece (99) connected at one end to an exterior portion of a subsea equipment vessel wall of a subsea equipment, and communicating with an interior portion of the subsea equipment vessel through a passage in the subsea equipment vessel wall;
- a housing (101, 117) with a housing chamber (107, 116) arranged on the interconnection piece (99) at another end thereof and at a distance from an exterior location of the subsea equipment vessel wall, the housing chamber (107, 116) containing a pressure barrier (102) exhibiting an electrically insulating material (106) around the conductor pin or pins (103) penetrating the pressure barrier (102) of the penetrator assembly (100),
- the housing (101, 117) being at such a distance from the exterior portion of the subsea equipment vessel wall by means of the interconnection piece (99), and the housing exhibiting a surface area and shape so as to enable heat transfer to the seawater and thereby cooling of the housing (101, 117) and the interconnection piece (99), the seawater freely flowing about the housing (101, 117) and the interconnection piece (99) in thermal contact therewith, the cooling yielding a temperature of the housing (101, 117) and the interconnection piece (99) and their contents to be is lower than the temperature inside the subsea equipment vessel and subsea equipment vessel wall during operation of the subsea equipment.

38. Penetrator assembly according to claim 37, said interconnection piece (99) being of a material which is temperature compatible with the subsea equipment vessel wall in regard to the thermal expansion coefficients through a scheduled operating temperature range.

39. Penetrator assembly according to claim 37, said interconnection piece (99) having a cross section that is smaller than the diameter of the housing.

40. Penetrator assembly according to claim 37, said housing (101, 117) or interconnection piece (99) comprising external passive cooling means.

* * * * *